United States Patent [19]
Barsumian

[11] Patent Number: 5,241,699
[45] Date of Patent: Aug. 31, 1993

[54] ELECTRONIC SURVEILLANCE DEVICE DETECTOR AND METHOD USING PHASE ANGLE DIFFERENCES BETWEEN TWO RECEIVED SIGNALS

[76] Inventor: Bruce R. Barsumian, 890 Dago Rd., Cookeville, Tenn. 38501

[21] Appl. No.: 580,963

[22] Filed: Sep. 10, 1990

[51] Int. Cl.[5] .............................................. H04B 1/16
[52] U.S. Cl. .................. 455/228; 455/67.2; 455/226.4; 379/7
[58] Field of Search ................ 455/67, 226, 227, 228, 455/67.2, 67.6, 67.7, 226.4, 67.4; 367/125, 128; 379/7, 34

[56] References Cited

U.S. PATENT DOCUMENTS

| | | | |
|---|---|---|---|
| 4,218,592 | 8/1980 | Steinbergs et al. | 379/7 |
| 4,658,099 | 4/1987 | Frazer | 379/7 |
| 4,797,635 | 1/1989 | Hatcher | 331/25 |
| 5,034,963 | 7/1991 | Singer | 455/226 |

Primary Examiner—Reinhard J. Eisenzopf
Assistant Examiner—Edward Urban
Attorney, Agent, or Firm—Luedeka, Hodges, Neely & Graham

[57] ABSTRACT

The disclosed invention detects electronic surveillance devices. Should an electronic surveillance device (a bug) be present in a room, the bug will be detecting sounds with a microphone and transmitting on some electromagnetic frequency. In the present invention, these signals are received by a receiver which produces a receiver signal, and a microphone converts the sound present in the room into an electronic reference signal. As may be noted both the received signal from the electronic surveillance device and the reference signal from the reference microphone will have as their source the sounds that are within the room. It is this common sound source of both signals that allows the presence of an electronic surveillance device to be detected. According to the present invention, the phase angle difference between the receiver signal and the reference signal is examined in order to decide if there is any phase correlation. Should the received signal and the reference signal be either in phase, or have relatively constant phase angle differences, then an electronic surveillance device is present in the room. In addition to detection, the present device may be used to locate the electronic surveillance device by movement of the reference microphone. By moving the reference microphone and noting the variation in the phase angle and signal correlation level, an operator may move the reference microphone until the phase angle difference is minimized. At this point, the reference microphone may be in close proximity to the electronic surveillance device and a non-electronic search for the device may be instituted.

18 Claims, 4 Drawing Sheets

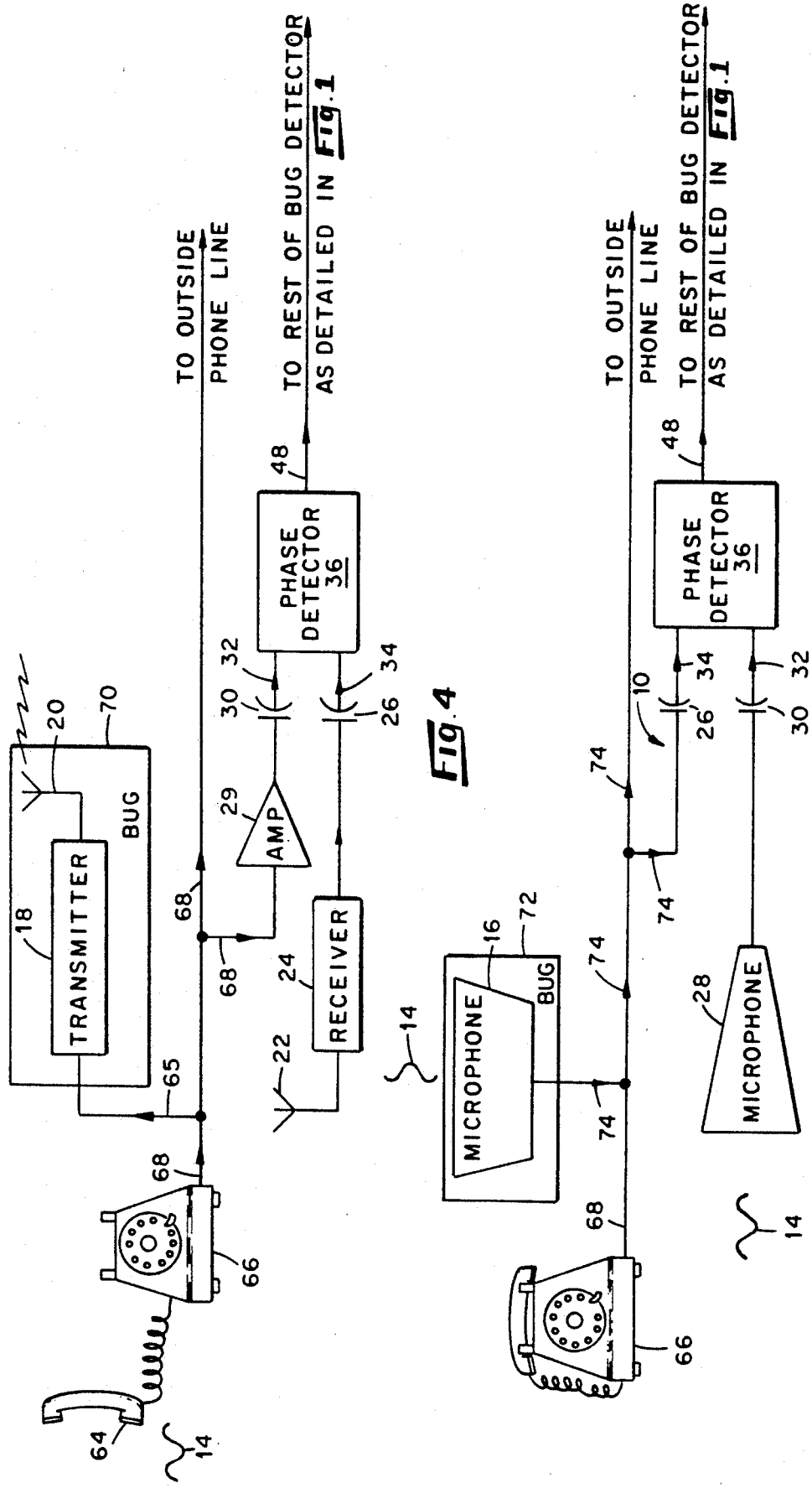

ELECTRONIC SURVEILLANCE DEVICE DETECTOR AND METHOD USING PHASE ANGLE DIFFERENCES BETWEEN TWO RECEIVED SIGNALS

FIELD OF THE INVENTION

This invention relates generally to the field of radio transmitter detection and in particular, to the detection of electronic surveillance devices.

BACKGROUND OF THE INVENTION

A typical electronic surveillance device consists of two main components. The first component is a microphone or transducer which picks up the sounds present in a given space, such as a room, and converts them into an electronic signal. This electronic signal is then transferred to a transmitter which converts the electronic signal into an electromagnetic signal which is then transmitted. The transmitted electromagnetic signal may be radio, microwave, light, low frequency electrical or other, and it may be transmitted in a number of ways such as through space or over existing wires. It is the presence of this transmitted electromagnetic signal that makes an electronic surveillance device subject to detection.

Some detection devices require the introduction of specialized sound into the environment which is to be searched for an electronic surveillance device. However, the introduction of such specialized sounds would indicate that the bug was either suspected or had been detected thus enabling the person using the electronic surveillance device to turn it off, if possible, or abandon it.

The current state of the art relies upon an operator listening to the sounds present in a room and to signals intercepted by a receiver. A bug has been detected when the received signal (as played through speakers or a head set) matches the sounds within a room. However, if there is noise present in the room it becomes difficult if not impossible for an operator to detect any correlation.

It has been a limitation of prior art devices to be to some extent frequency dependent; that is, the absence of a particular frequency, or the presence of too many frequencies (such as noise) degrades their ability to detect bugs present in a room.

The present device overcomes such limitations by being frequency independent and will function effectively in an environment containing one frequency, multiple frequencies, changing frequencies or just noise.

SUMMARY OF THE INVENTION

Deficiencies in the electronic surveillance device detecting devices previously described, are eliminated by the phase comparing technique of the present invention. Accordingly, it is the object of the present invention to provide a means for detecting an electronic surveillance device that is not subject to frequency related limitations and does not require the introduction of specialized sounds into the environment. The electronic surveillance device detector of the present invention uses a reference microphone to pick up the sounds inherent in the environment to be searched. The microphone converts the sounds in the room into an electronic reference signal. A receiver or other device picks up the transmissions which may have resulted from an electronic surveillance device. The output of this receiver provides an intercept signal which will be compared to the reference signal.

The reference signal and the intercept signal are inputs to a phase detecting device which compares the two signals and generates a phase detection signal which corresponds to the phase angle differences between the intercept signal and the reference signal. Inherent in the phase detection signal will be random correlations between the phases of the signals which will occur naturally without the presence of an electronic surveillance device. However, if an electronic surveillance device is present, the phase angle difference between the reference signal and the intercept signal will either be zero, or there will be substantially constant phase angle differences. In practice, the phase angle between two signals may be small but it will never be zero. In any event, the phase detection signal will correspond to the phase angle differences between the reference signal and the intercept signal. If the phase angle differences remain constant over a period of time then there is phase correlation between the two signals.

A monitoring system will then process the phase detection signal. Random phase correlations will integrate to zero, while non-random phase correlations will add and grow with time. By observing the output generated by the monitoring means the presence of an electronic surveillance device can be detected and, by moving the reference microphone around the room, the location of the electronic surveillance device may also be determined.

Since the present invention operates by comparing the phase angle differences between two signals as opposed to searching for a coincidence of a particular frequency, the absence of any particular frequency in the sounds in a given environment to be searched will not lessen the effectiveness of the present device. In addition, the present invention provides for the location of an electronic surveillance device rather than just an indication that the surveillance device is within the room.

BRIEF DESCRIPTION OF THE DRAWINGS

Whereas the above describes the field and background of electronic surveillance device detection and the general features of the present invention, we now describe a preferred embodiment thereof. This description is for illustration and not limitation of the present invention and may best be understood by reference to the drawings in which:

FIG. 4 is block schematic of an alternative embodiment of the electronic surveillance device detector.

FIG. 5 is a block schematic of an alternative embodiment of the electronic surveillance device detector.

DETAILED DESCRIPTION OF A PREFERRED EMBODIMENT

Figure 1:
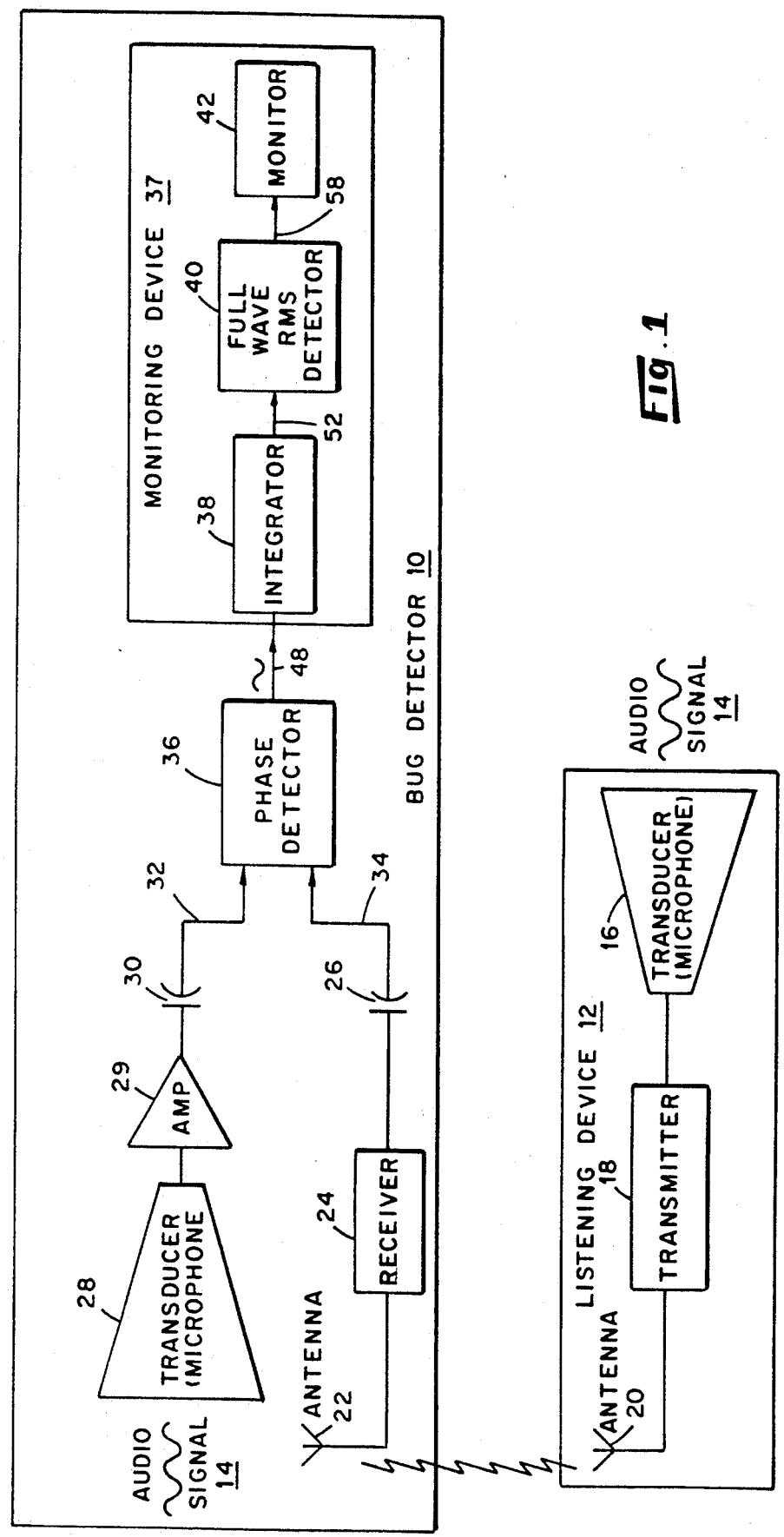
FIG. 1 is a block schematic of the electronic surveillance device detector.

Referring now to the figures in which like reference numerals indicate like or corresponding features, there is shown in FIG. 1 a preferred embodiment of the present Electronic Surveillance Device (Bug) Detector 10. The electromagnetic transmissions of a bug are received by an antenna 22 and receiver 24 and a capacitor 26 provides AC coupling to produce an intercept signal 34. It will be understood that receiver 24 could be adapted to receive light, microwave, television, low-frequency or other signals. Simultaneously, the background noise in the room 14 is received and converted into an electronic signal by a microphone 28. This signal is amplified 29 and is AC coupled through a capacitor 30 to produce an electronic reference signal 32.

In operation a bug 12 picks up the sounds 14 present in a room and converts these sounds to an electronic signal by means of a transducer 16. The electronic signal is an input to a transmitter 18 which is broadcast through an antenna 20. It is these electromagnetic transmissions which are received at antenna 22. Again, it will be appreciated that the bug 12 may be transmitting at any frequency including light or ultra-low frequencies. Also, the bug 12 may be a microphone producing direct audio signals on wires such as existing telephone or electric wires.

In a normal operating environment, there will be a multitude of electromagnetic transmissions other than those transmitted by a bug, present at any location. Such transmissions could result from a variety of sources such as broadcast radio and television, two way radios, television remote controllers, microwave transmissions, etc. and it is from this mass of electromagnetic information that a signal from a bug must be separated to be detected.

As is indicated by FIG. 1, the reference signal 32 and the intercept signal 34 both result from the background noise 14 present in the room. If the antenna 22 is receiving a transmission from a bug 12 then there will be some phase correlation between the reference signal 32 and the intercept signal 34. In a typical environment, the sound 14 present will present a very complex waveform for a variety of reasons. Since typical sounds are a mixture of frequencies, phase angle differences inherently will be caused by the different frequencies. Additionally, reflections of sound occurring within the room from walls or ceilings and furniture greatly complicate the waveform as well. However, regardless of the complexity of the waveform, there will be a recognizable phase correlation between the reference signal 32 and a signal 34 received from a bug.

It is this phase relationship between the reference signal 32 and the intercept signal 34 that allows for the detection of a bug. Both signals, 32 and 34, are input into a Phase Detector 36 which generates a phase detector signal 48 which is the output. This phase detector 36 compares the signals 32 and 34 and generates a phase detector signal 48 which corresponds the phase angle differences between the intercept signal 34 and the reference signal 32.

If there is no bug 12 in the room, then the phase detector signal 48 will be a rapidly varying signal due to random phase correlations between the sound 14 in the room and the electromagnetic "noise" received by the receiver 24. If, however, there is a bug 12 in the room, then the phase detector signal 48 will correspond to the phase angle differences as described above. At a zero degree phase difference, the phase detector signal 48 will be a maximum positive value. At a one-hundred eighty degree phase difference, the signal 48 will be a maximum negative value. At a ninety or two-hundred seventy degree phase difference, the signal 48 will be zero. However, if a bug is being detected, numerous sound frequencies will correlate in phase and it is impossible for all frequencies to have a constant ninety or two-hundred seventy degree phase difference.

To extract the usable information from the phase detector signal 48 a monitoring system 37 is employed. There are three main components of this system: an integrator 38, a full wave root mean square detector 40, and a monitor 42.

Initially, the phase detector signal is the input to an integrator 38 which produces an integrator signal 52. The integrator signal 52 is input into a full wave root mean square detector 40 to provide a detect signal 58. Upon integrating the phase detection signal 48 the integrator signal 52 can have a variety of values. If the phase detection signal 48 is comprised mainly of random phase correlations, as when a bug 12 is not present, then the signal 48 will integrate to a minimum absolute value and the integrator signal 52 will be near zero. If, on the other hand, a bug 12 is present, then the integrator signal 52 will grow with time until reaching a maximum absolute value.

For example, assuming the scale of the detect signal is calibrated to provide a signal ranging from zero to ten units, with ten being the maximum, it has been determined that random electronic noise received by the receiver 24 and compared to a reference signal 32 will cause the detect signal 58 to be about 1 unit. If the intercept signal 34 is music and the reference signal 32 is also music, but is different from the music in intercept signal 34, the detect signal 58 will be about 2 units. These results indicate that the phase correlation between signals 32 and 34 is low and is the result of random correlations; therefore the integrator signal 52 is near its minimum.

Should a bug be present in the room, however, the level of the detect signal 58 will be much higher, about 6 units. The number of frequencies present in the sound 14 and the echoes in the room, tend to degrade the correlation to some extent and prevent the detect signal 58 from having its maximum value.

While the degradation of correlation described above may appear to be a problem, it is in fact useful. While the microphone 28 is still some distance from the bug 12, the degradation is relatively constant and provides a detect signal 58 of substantially constant strength. However, once the microphone 28 gets to about two feet away from the bug 12, the degradation of signal correlation due to sonic delay phase shifts begins to decrease and the level of the detect signal 58 begins to increase. When the microphone 28 is adjacent to the bug 12, then the degradation will be minimized and the detect signal 58 will be at its maximum, usually 8-10 units.

Figure 2:
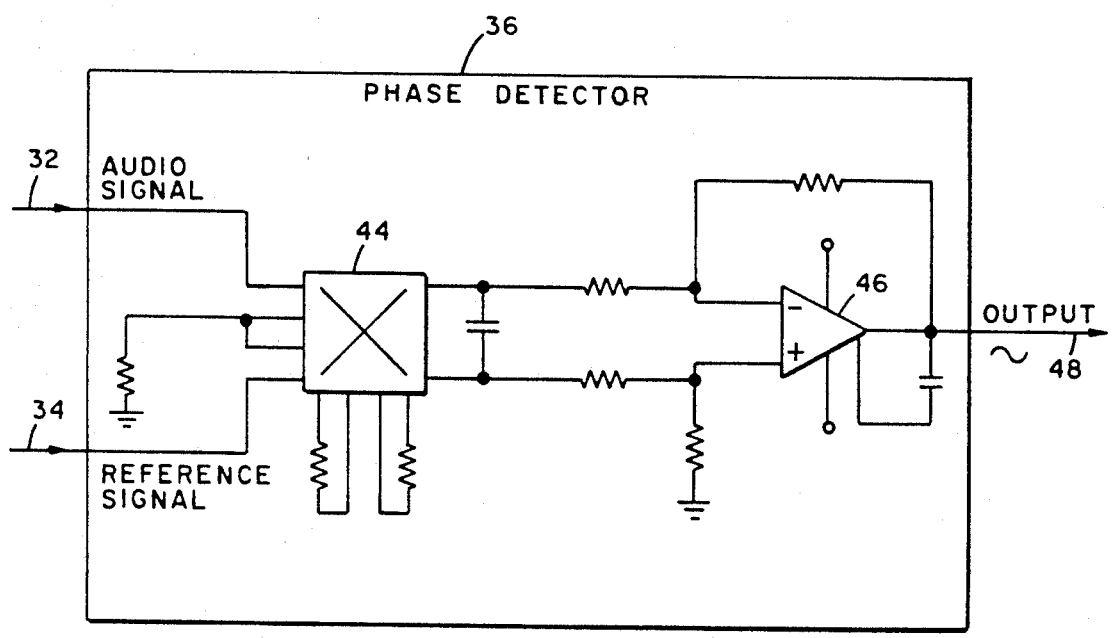
FIG. 2 is a circuit diagram of the phase detector.

Referring now to FIG. 2, a circuit diagram for a preferred phase detector 36 is shown. The reference 32 and the intercept signal 34 are input into a four-quad multiplier, such as EXAR XR-2228, on pins 2 and 5. The output at pins 1 and 16 of the multiplier 44 is D/C coupled and serves as the input at the positive and negative inputs of an operational amplifier 46 configured as a differential amplifier. In the embodiment, the amplifier 46 is provided as part of the multiplier chip. The output of the amplifier 46 is then the phase detection signal 48.

Figure 3:
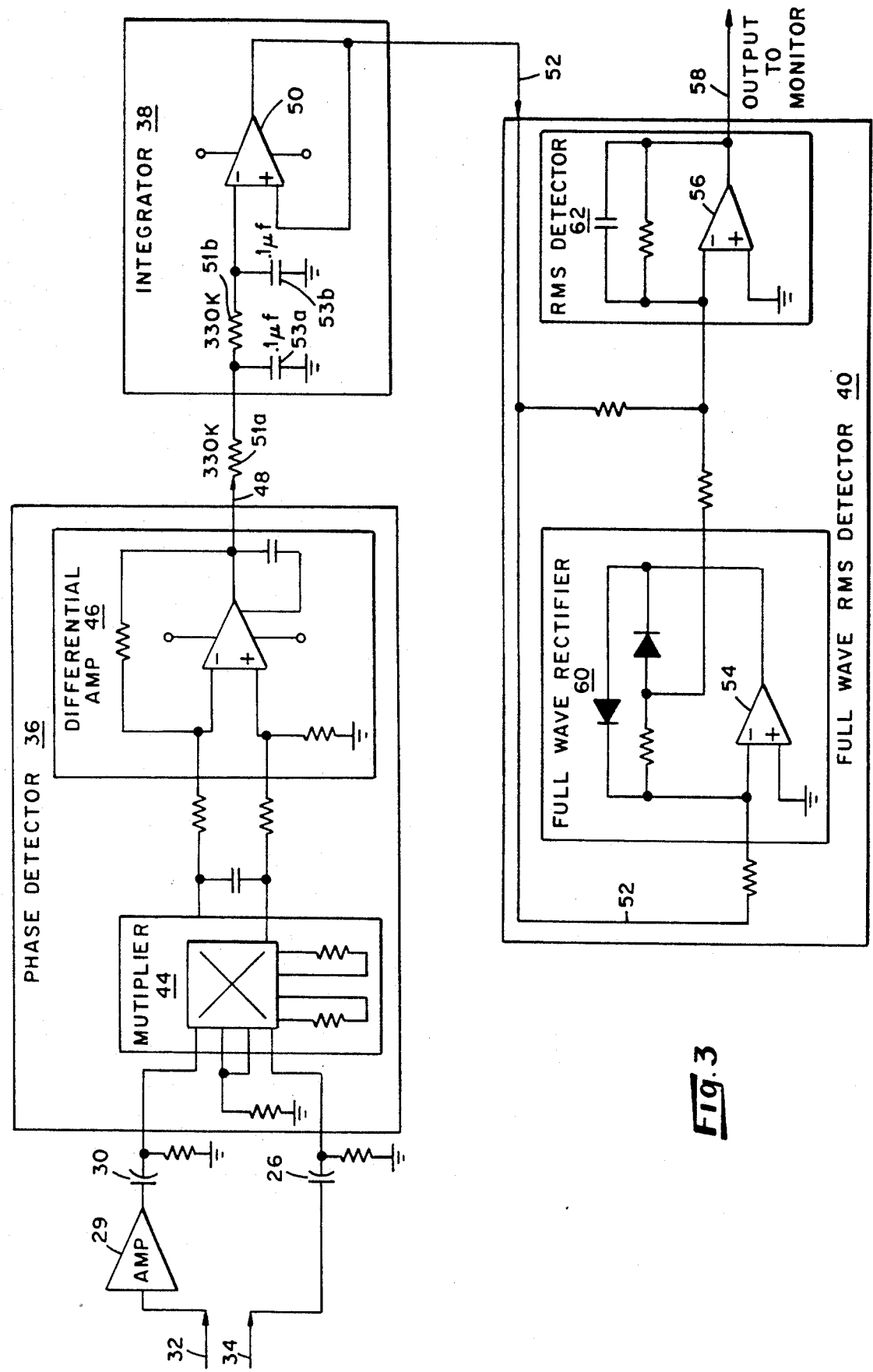
FIG. 3 is a circuit diagram of the block schematic on FIG. 1.

Referring now to FIG. 3, a circuit diagram of the preferred embodiment of the bug detector is shown, the input devices for signals 32 and 34 as well as the monitor 42 are not shown for the sake of clarity. The phase detector 36 of FIG. 3 is identical to that of FIG. 2 and, therefore, will not be described again.

The output 48 of the phase detector 36 is input into an integrator 38 which provides a means for integrating the signal 48 over a period of time. The integrator 38 consists of an operational amplifier 50, resistors 51a and 51b, and capacitors 53a and 53b configured as an integrator as shown. In the preferred embodiment, the amplifier 50 is one of the amplifiers on a National LM-3403 quad amplifier.

The output 52 of the integrator 38 is then operated on by a Full Wave Root Mean Square Detector 40. This detector 40 consists of a first operational amplifier 54 configured as a full wave rectifier and a second operational amplifier 56 configured as an RMS detector. The amplifiers 54 and 56 constitute two other amplifiers of the National LM-3403 quad amplifier. If the output 52 of the integrator 38 is negative, the detector 40 will convert it to a positive signal by full wave rectification before producing the RMS value of output 52. The combined effect of operational amplifiers 54 and 56 is to produce a D/C output 58 (the detect signal) that is proportional to the full wave rectified RMS value of output 52. The level of this D/C output 58 will be equal to the amount of phase correlation between the reference signal 32 and the intercept signal 34. This D/C signal would normally be monitored by a computer but it may also be viewed by an operator on a monitor 42.

An alternative embodiment is shown in FIG. 4. In this alternative embodiment the electronic surveillance device 70 no longer uses the microphone 16 of FIG. 1 to intercept the sounds in the environment; rather, a wire is connected to a telephone wire which leads to a transmitter 18 and antenna 20 of the bug 70. In this manner, when the phone 66 is in use, as when somebody is speaking through the mouthpiece transducer 64, a telephone signal 68 is generated and travels out over the phone lines. This bug 70 intercepts the telephone signal 68 and the transmitter 18 changes that to an electromagnetic signal which is then broadcast over antenna 20. These electromagnetic transmissions are then received by antenna 22 and receiver 24 to generate an intercept signal 34 which goes into the phase detector 36. In place of the reference microphone 28 of FIG. 1, this embodiment uses the telephone signal 68 as the reference signal 32 which is input into amplifier 29 and then to the phase detector 36. The reference signal 32 and intercept signal 34 are then operated on in the same manner as in the previous embodiment.

Another alternative embodiment is shown in FIG. 5. In this embodiment the bug uses a microphone 16 to receive sounds in the room 14 and convert them into a signal 74. However, unlike the bug in the first embodiment as shown in FIG. 1, the signal 74 is not modulated by a transmitter 18. Instead, the direct audio signal 74 is coupled to the telephone lines 68. In use, the direct audio receiver 24 of the bug detector 10 is connected to the telephone lines 68 and the signal occurring over the telephone line 68 provides the intercept signal 34 which, in turn, is input into the phase detector 36. In this circumstance the transmission of the phone 66 is not intercepted by the bug 72. The bug 72 is merely using the phone lines 68 as a transmission path. When the phone 66 is hung up, any signal being transmitted over the phone line is being generated by a bug 72. Also, a bypassed hookswitch on the phone 66, for example, would prevent the phone from being "hung up" and would create a live microphone connected to the phone wires 68. Thus a bypassed hookswitch would, in effect, create a bug 72 as shown in FIG. 5. The reference signal for the FIG. 5 embodiment is generated in the same fashion as it is in the first embodiment, that is by a microphone 28 picking up audio signals 14 in the room and converting them into an electronic signal which is then A/C coupled by a capacitor 30 to input the reference signal 32 into phase detector 36. Once the intercept signal and reference signal are input into the phase detector, they are operated on in the same manner as was described in the first embodiment.

Although a preferred embodiment of this invention has been described in detail above, one skilled in the art would recognize that numerous modifications and alterations are possible without departing from the spirit of the invention. It is understood that the entire circuit shown in FIGS. 1-5 could be implemented in a digital format. Therefore, it is understood that the preceding description of a preferred embodiment was for the purposes of illustration rather than limitation of the invention.

I claim:

1. A method for detecting the presence of an electronic surveillance device that is generating a signal corresponding to sound in an environment comprising:
   detecting the ambient sound in the environment;
   generating a reference signal corresponding to the sound ambient in the environment;
   generating an intercept signal corresponding to signals present in the environment other than audible sound signals;
   comparing said reference signal to said intercept signal and generating a phase detection signal corresponding to the phase angle differences between said reference and said intercept signals; and
   analyzing said phase detection signal to produce a detect signal having a magnitude corresponding to the level of phase correlation between said reference and said intercept signals and indicating the presence or absence of an electronic surveillance device in said environment based upon the magnitude of said detect signal.

2. An electronic surveillance device detector for detecting the presence of an electronic surveillance device that is generating a signal corresponding to sound in an environment comprising:
   reference signal generation means for generating a reference signal corresponding to the ambient sound in the environment;
   intercept signal generation means for generating an intercept signal corresponding to electronic signals present in the environment;
   a phase detector comparing said reference signal to said intercept signal and generating a phase detection signal corresponding to the phase angle differences between said reference and said intercept signal; and
   monitor means for analyzing said phase detection signal and producing a detect signal having a magnitude that corresponds to the level of phase correlation between said reference signal and said intercept signal and indicating the presence or absence of an electronic surveillance device in said environment based on the magnitude of said detect signal.

3. The apparatus of claim 2 wherein the reference signal generation means comprises a microphone.

4. The apparatus of claim 2 wherein the reference signal generation means comprises:

a telephone in use in the environment which is generating a telephone signal corresponding to the sounds in the environment; and means for inputting said telephone signal into said electronic device detector as said reference signal.

5. The apparatus of claim 2 wherein the intercept signal generation means comprises an electronic receiver for monitoring the electromagnetic spectrum and generating an intercept signal corresponding to received electromagnetic energy.

6. The apparatus of claim 2 wherein the intercept signal generation means comprises:

telephone lines in the environment; and means connected to said telephone lines for producing said intercept signal whereby said intercept signal corresponds to electronic signals appearing on said telephone lines.

7. The apparatus of claim 2 wherein the phase detector comprises:

a four quadrant multiplier having as inputs said reference and intercept signals and producing a multiplier output; and a differential amplifier having as an input said multiplier output and generating said phase detection signal.

8. The apparatus of claim 2 wherein said monitor means further comprises:

an integrator for integrating said phase detection signal over a period of time and generating an integrator output;

a full wave root mean square detector for operating on said integrator output and producing said detect signal corresponding to the full wave rectified RMS value of the integrator output, said detect signal indicating the level of phase correlation between said reference signal and said intercept signal; and display means for displaying information corresponding to said detect signal.

9. The apparatus of claim 8 wherein the display means further comprises a meter for displaying a value corresponding to the magnitude of the detect signal.

10. An electronic surveillance device detector for detecting the presence of an electronic surveillance device that is receiving sound in an environment of sound and electromagnetic energy and transmitting a signal corresponding to the sound comprising:

an electronic receiver for monitoring the electromagnetic spectrum and generating an intercept signal corresponding to received electromagnetic energy;

a transducer for detecting and converting ambient sounds in the environment into a reference signal;

a phase detector comparing said reference signal to said intercept signal and generating a phase detection signal corresponding to the phase angle difference between said reference and intercept signals; and monitor means for analyzing said phase detection signal over a period of time and producing a detect signal having a magnitude that corresponds to the level of phase correlation between said reference signal and intercept signal and indicates the presence or absence of an electronic surveillance device in said environment based on the magnitude of said detect signal.

11. The apparatus of claim 10 wherein the phase detector comprises:

a four quadrant multiplier having as inputs said reference and intercept signals and producing a multiplier output; and a differential amplifier having as an input said multiplier output and generating said phase detection signal.

12. The apparatus of claim 10 wherein said monitor means further comprises:

an integrator for integrating said phase detection signal over a period of time and generating an integrator output;

a root mean square detector for operating on said integrator output and producing an averaged D/C signal corresponding to the level of correlation between said reference signal and said intercept signal, said averaged D/C signal being said detect signal; and monitor means for displaying information corresponding to said averaged D/C signal.

13. The apparatus of claim 10 wherein said monitor means comprises an integrator.

14. The apparatus of claim 12 wherein said root mean square detector means comprises a full wave root mean square detector.

15. The apparatus of claim 12 further comprising a meter for displaying a value corresponding to the magnitude of the averaged D/C signal.

16. A method for detecting the presence of an electronic surveillance device that is receiving sound in an environment also containing electromagnetic energy and transmitting electromagnetic energy corresponding to the sound comprising the steps of:

receiving the electromagnetic spectrum which may containing electromagnetic energy transmitted by an electronic surveillance device and generating an electronic intercept signal corresponding to received electromagnetic energy;

detecting and converting ambient sounds in the environment into an electronic reference signal;

comparing said reference signal to said intercept signal and generating a phase detection signal corresponding to the phase angle difference between said reference and intercept signals; and analyzing said phase detection signal over a period of time and producing a detect signal having a magnetic indicating the level of phase correlation between the audio and receiver signals and indicating the presence or absence of an electronic surveillance device in said environment based on the magnitude of said detect signal.

17. The method of claim 16 wherein said step of analyzing comprises integrating the phase detection signals over a selected period of time to produce an integrator signal that corresponds in magnitude to phase correlation between the reference signal and the intercept signal.

18. The method of claim 16 wherein said detecting and converting step further comprises receiving sounds at different positions in the environment and locating one of the different positions at which the detect signal is largest said located position being an indication of the position of the electronic surveillance device.

* * * * *